Patented June 23, 1936

2,045,017

UNITED STATES PATENT OFFICE 2,045,017

FLUX

Frank M. Levy, Port Huron, Mich., assignor to Mueller Brass Co., Port Huron, Mich., a corporation of Michigan No Drawing. Application February 4, 1935, Serial No. 4,881

2 Claims. (Cl. 148—26)

This invention relates to fluxes, and with regard to certain more specific features, to fluxes particularly adapted for use in connection with soldering operations.

Among the several objects of the invention may be noted the provision of a soldering flux which, when used on copper, brass and similar articles, enhances the coverage with solder from the standpoint of homogeneity and smoothness; a flux which so prepares the surface to which it is applied that when solder is later applied thereto, the solder adheres with equal facility to the entire area of the surface; the provision of a flux of the class described which aids the flowability of the molten solder by decreasing the surface tension thereof; and the provision of a flux of the class described which is compounded from inexpensive ingredients and is thus economical to manufacture and use. Other objects will be in part obvious and in part pointed out hereinafter.

The invention accordingly comprises the elements, and combinations of elements, and features of composition, which will be exemplified in the products hereinafter described, and the scope of the application of which will be indicated in the following claims.

For certain types of soldering operations, such as the making of pipe joints, a paste flux is far more desirable than any of the liquid fluxes. In the past, there have been proposed many types of such paste fluxes. Some of these have been relatively successful, but difficulties have been experienced in securing a paste-type flux which will invariably so condition the surface to which it is applied, that the molten solder will distribute itself evenly over said surface and adhere uniformly to the entire area thereof, without leaving untinned pin-holes or similar areas. This is particularly true of prior fluxes when applied to brass alloys of high zinc content, which somehow seem to have less affinity for the ordinary solders than do other brasses, coppers, bronzes, or the like.

It is likewise a fact that many fluxes are designed particularly for use with the so-called "50-50" solder, which is composed of one-half lead and one-half tin. These fluxes do not work with comparable success on higher melting point solders, such as a solder composed of 95 parts of tin and 5 parts of antimony by weight. This latter solder is desirable in some instances.

The present invention provides a flux, which, when used with "50-50" solder, permits improved coverage of the metal being soldered, avoiding pin-holes and the like. Moreover, the flux of the present invention operates in the same manner, with high efficiency, on high temperature solders, such as the 95 tin-5 antimony solder mentioned above.

The majority of the paste-type solders available today include the following ingredients: petrolatum, ammonium chloride, zinc chloride, and water. The petrolatum is a heavy, greasy hydrocarbon.

A principal distinction of the present invention over such prior fluxes is found in the addition of a small portion of stannous chloride, to the above ingredients. The adding of stannous chloride, which operates in conjunction with the zinc chloride, seems to be the principal reason for the success of the present flux. That there is a clear cooperative action of the stannous chloride and the zinc chloride is indicated by the fact that, if in the ordinary fluxes, the zinc chloride is entirely substituted by stannous chloride, such fluxes in nowise measure up to the properties of the flux containing both zinc and stannous chlorides.

As a particular non-limiting example of a flux composition embodying the present invention, the following formula is given:

| | Per cent |
|---|---|
| Petrolatum | 70.0 |
| Ammonium chloride | 4.5 |
| Zinc chloride | 16.8 |
| Stannous chloride | 5.0 |
| Water | 3.7 |
| Total | 100.0 |

In the normal soldering fluxes, the ammonium chloride is usually held down to the order of 2½%. The increase in the above formula is intentional; it having been found that, with forged brass articles, the excess ammonium chloride does not cause any deleterious corrosive effect in the concentration given. With finer articles, such as fine wire, however, it would be advisable to reduce the proportionate quantity of ammonium chloride in the above formula to the order of 2 to 2½%.

The proportion stated in the above formula between zinc chloride and stannous chloride appears to give the best results in the compounded flux, although superior results are attained with wide variations of both the proportion and total amount of these substances.

When a flux made up according to the formula above set forth is spread uniformly over the forged yellow brass article to be soldered, and the solder is flowed thereover, it will be found that an unusually perfect coverage with solder is achieved, and also that the flowability of the solder, while it is still liquid, is improved.

The above flux is particularly suitable for use with solder containing 95 parts of tin and 5 parts of antimony, by weight.

The reason for the improved action of solders containing both zinc and stannous chloride is apparently found in the tendency, when under the heated condition incident to a soldering operation, for the zinc to cause the tin to be plated from the flux directly on the surface of the article to which the solder is to be applied. In other words, the tin in the flux of the present invention apparently initially tin-plates the articles to be soldered, and this tin-plating has an increased adherence to and for the molten solder.

The flux of the present invention is manufactured in the customary manner for materials of this sort. That is, the ingredients are homogenized together into a paste of uniform composition by grinding or stirring them together. For a proper action, it is desirable that the mixing of the several ingredients be thorough.

Under certain circumstances, salts of zinc and tin other than the chlorides thereof (such as nitrates, for example) may be used with excellent results.

In view of the above, it will be seen that the several objects of the invention are achieved and other advantageous results attained.

As many changes could be made in carrying out the above compositions without departing from the scope of the invention, it is intended that all matter contained in the above description shall be interpreted as illustrative and not in a limiting sense.

I claim:

1. A soldering flux composed of stannous chloride and ammonium chloride in approximately equal parts, zinc chloride in considerable excess over said stannous chloride and ammonium chloride, and a petroleum-base greasy carrier material.

2. A soldering flux having substantially the following composition:

| | Per cent |
|---|---|
| Petrolatum | 70.0 |
| Ammonium chloride | 4.5 |
| Zinc chloride | 16.8 |
| Stannous chloride | 5.0 |
| Water | 3.7 |

FRANK M. LEVY.